United States Patent [19]

Golbert et al.

[11] Patent Number: 5,490,279
[45] Date of Patent: Feb. 6, 1996

[54] METHOD AND APPARATUS FOR OPERATING A SINGLE CPU COMPUTER SYSTEM AS A MULTIPROCESSOR SYSTEM

[75] Inventors: Adalberto Golbert, Haifa, Israel; Douglas M. Carean, Beaverton; Roshan J. Fernando, Parkland, both of Oreg.; Amar A. Ghori, Sacramento, Calif.; Yoav Hochberg; Robert F. Krick, both of Beaverton, Oreg.; Milind Mittal, South San Francisco, Calif.; Anurag Sah, Aloha, Oreg.

[73] Assignee: Intel Corporation, Santa Clara, Calif.

[21] Appl. No.: 65,597

[22] Filed: May 21, 1993

[51] Int. Cl.$^6$ .............................. G06F 3/00; G06F 15/17
[52] U.S. Cl. ................. 395/800; 364/228; 364/229.1; 364/229.2; 364/232.8; 364/DIG. 1
[58] Field of Search ..................... 395/325, 800, 395/308, 309

[56] References Cited

U.S. PATENT DOCUMENTS

| | | | |
|---|---|---|---|
| 4,481,572 | 11/1984 | Ochsner | 395/325 |
| 4,547,849 | 10/1985 | Louie et al. | 395/823 |
| 4,574,345 | 3/1986 | Konesky | 395/800 |
| 4,622,631 | 11/1986 | Frank | 395/800 |
| 4,672,535 | 6/1987 | Katzman | 395/800 |
| 4,716,526 | 12/1987 | Mori et al. | 395/800 |
| 4,769,771 | 9/1988 | Lippmann | 395/200 |
| 4,794,523 | 12/1988 | Adan et al. | 395/250 |
| 4,885,482 | 12/1989 | Sharp et al. | 307/465 |
| 4,967,346 | 10/1990 | Freidin | 395/500 |
| 5,018,170 | 5/1991 | Wilson | 375/376 |
| 5,025,387 | 6/1991 | Frane | 395/550 |
| 5,109,329 | 4/1992 | Strelioff | 395/725 |
| 5,111,423 | 5/1992 | Kopec | 395/500 |
| 5,133,064 | 7/1992 | Hotta | 395/550 |
| 5,162,979 | 11/1992 | Anzelone et al. | 361/415 |
| 5,297,272 | 3/1994 | Lu et al. | 395/500 |
| 5,335,329 | 8/1994 | Cox | 395/325 |
| 5,335,335 | 8/1994 | Jackson | 395/425 |
| 5,440,755 | 8/1995 | Harwer | 395/800 |

FOREIGN PATENT DOCUMENTS

| | | |
|---|---|---|
| 52078 | 10/1988 | China . |
| 50162 | 4/1991 | China . |
| 66282 | 4/1991 | China . |
| 267613 | 5/1988 | European Pat. Off. . |
| 333318 | 9/1989 | European Pat. Off. . |
| 381448 | 8/1990 | European Pat. Off. . |
| 411806 | 2/1991 | European Pat. Off. . |
| 0529142A1 | 8/1991 | European Pat. Off. . |
| 510241 | 10/1992 | European Pat. Off. . |
| 2264375 | 8/1993 | United Kingdom . |
| 8912274 | 12/1989 | WIPO . |

OTHER PUBLICATIONS

IBM Technical disclosure bulletin "Intel 80386 or INTEL P9 Delection", vol. 32 No. 4A Sep. 1989.
"Compaq System Pro Personal Computer System" Technical Reference Guide, Chap. 3, pp. 27–42.

Primary Examiner—Eric Coleman
Attorney, Agent, or Firm—Blakely, Solkoloff, Taylor & Zafman

[57] ABSTRACT

A method and apparatus for upgrading a uniprocessor system to a multiprocessing system simply by the insertion of a second microprocessor integrated circuit. The computer system is provided with an upgrade socket for receiving the second processing unit, as well as a private communications bus between the upgrade socket and the existing processor for handling interprocessor communications, bus arbitration and cache coherency, etc. The addition of the second processor is transparent to the system which maintains its memory management unit and caching system and other arrangements as though it were still a uniprocessing system. Therefore, an inexpensive method and apparatus are provided for greatly enhancing the speed of a uniprocessing system to that of a multiprocessing system without the cost traditionally associated with multiprocessing systems.

33 Claims, 4 Drawing Sheets

FIG_1

FIG_2

FIG_3

FIG_4

FIG_5

METHOD AND APPARATUS FOR OPERATING A SINGLE CPU COMPUTER SYSTEM AS A MULTIPROCESSOR SYSTEM

BACKGROUND OF THE INVENTION

1. Field of the Invention

The present invention relates to computer systems and more particularly to enhancing the performance of computer systems by introducing additional processor elements.

2. Prior Art

Computer technology has been developing for the past several decades. Much of the development in the computer field has focused on optimizing computer systems in which a single processor, the central processing unit (CPU), does primarily all of the work. These optimizations have been greatly increased with the advent of integrated circuit technology. The increased power has yielded hand-held and desktop computers today that are as powerful as mainframe, room-sized computers of not more than a decade ago. In principle, the computer architecture of these new smaller computers is similar to that of the old mainframes in which a single processing unit performs all of the computer's processing operations.

One drawback of the single processor computer system is that the single processor effectively creates a bottleneck in the system thus limiting the overall speed and power of the computer. Several decades ago, a number of computer developers began developing computer systems using multiple processors. Multiprocessing systems have traditionally been more complicated to build and design as well as more expensive than the more common single processor systems. This has often been acceptable where the increased performance available from a multiprocessing system outweighs the great additional cost and hardware required to support multiprocessing. Even today in the world of very large scale integration (VLSI), multiprocessing computer systems are far more expensive and complex than single processor systems of traditional design.

Another disadvantage to traditional single processor systems is that as technology advances so quickly, they soon become, if not obsolete, sub-standard. One solution that computer developers have embarked upon is to provide an upgrade socket alongside the socket in which the integrated circuit for the central processor is plugged in. Up until now the upgrade socket has allowed for two enhancements to the computer in which it is implemented. One is to allow the addition of a specialized coprocessor integrated circuit for carrying out specialized functions on behalf of the central processing unit. Examples of such upgrades are math coprocessors and graphics processors. The other enhancement provided by an upgrade socket is to allow the substitution of a more advanced CPU integrated circuit. When a CPU chip is developed that is more powerful than the one implemented on the computer board, the enhanced processor may be plugged into the expansion socket. The computer then, upon initialization, disables the existing processor slot and treats the upgrade processor slot with the upgraded processor as the primary processor for the single processing system.

Because of the high cost of developing multiprocessing systems, this has been the limit to expandability for single processing systems. However, if it were possible to merely plug in a second processor into an upgrade socket and then have the computer system utilize both processors as a multiprocessing system, an inexpensive way to enhance a single processing system would exist. Such a system would have great cost advantages and simplicity over existing multiprocessing system, and is therefore, an object of the present invention.

For further description of traditional single processing and multiprocessing systems, see J. L. Hennessey and D. A. Patterson, *Computer Architecture, A Quantitative Approach*, Morgan, Kaufman Publishers, Inc., 1990.

BRIEF SUMMARY OF THE INVENTION

It is an object of the present invention to enhance the speed and operation of computer systems.

It is also an object of the present invention to provide a means of upgrading a single processing computer system to be a multiprocessing system without the requirement that additional hardware be added other than a second microprocessor.

It is further an object of the present invention to provide the above objects as a low cost method of upgrading traditional uniprocessing systems.

These and other objects of the present invention are provided by supplying a traditional uniprocessing system with an upgrade socket for receiving a second processor integrated circuit. The upgrade socket is coupled to the primary central processing unit socket via a private communications bus which provides a means of communication between the two processors. The two processors are provided with controllers for using the private bus between them for arbitrating which owns the system's memory bus as well as for maintaining cache coherency and for processing system interrupts. The present invention is provided such that the addition of a second processor is transparent to the rest of the system. The computer remains unaware that it has become a multiprocessing system and therefore no additional hardware is required. All multiprocessing aspects are handled between the two processors across the private bus. The present invention therefore provides a method of upgrading a uniprocessing system to being a multiprocessing system with only the addition of a second processor and no additional hardware, thereby providing an inexpensive method for making a uniprocessing system multiprocessing.

The computer system implementing the multiprocessing architecture of the present invention will utilize symmetric multiprocessing memory in that the memory and external caching of the computer system will be shared commonly between the two processors and the processors themselves handle such things as allocating tasks between themselves and bus arbitration, etc. The present invention therefore allows greatly enhanced speed for a traditional uniprocessing system at a low cost of not much more than the cost of a second processor.

DETAILED DESCRIPTION OF THE INVENTION

A method and apparatus for enhancing the processing power of microcomputers is described in a system which provides for upgrading a uniprocessor system to be a multiprocessing one. In the following detailed description, numerous specific details are set forth such as specific computer components, etc., in order to provide a thorough understanding of the present invention. It will be apparent, however, to one skilled in the art that the present invention may be practiced without such specific details. In other instances, well-known components, structures and techniques have not been shown in detail to avoid unnecessarily obscuring the subject matter of the present invention.

Figure 1:
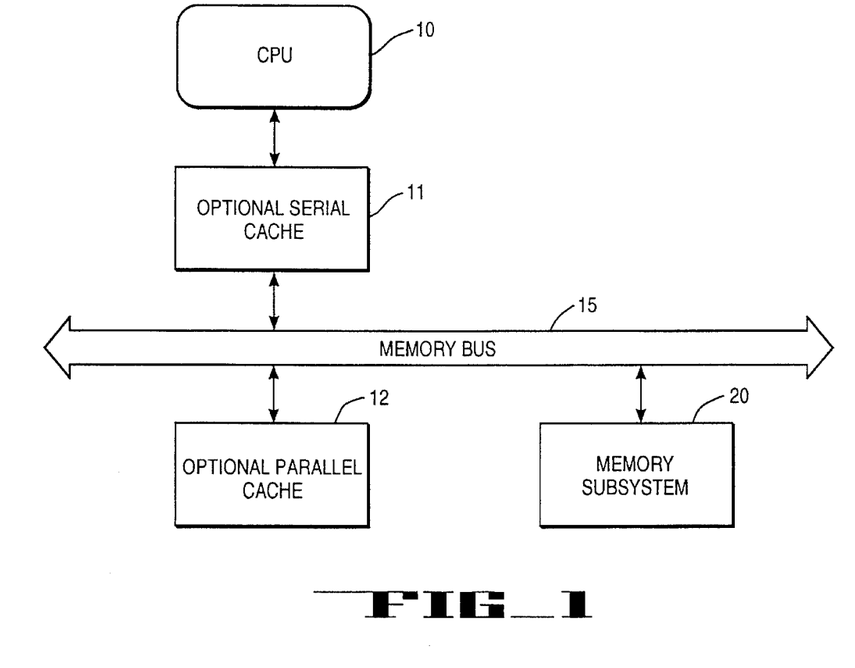
FIG. 1 shows a traditional microcomputer architecture in which a CPU and memory subsystem communicate through a memory bus. Optional cache memories are indicated.

Referring now to FIG. 1, a portion of a traditional microcomputer architecture is illustrated. In FIG. 1, the processing power for the computer is identified as central processing unit (CPU) 10. A memory subsystem 20 is coupled to a memory bus 15. When the processing portion of the architecture requires data from the memory subsystem or needs to write data to the memory subsystem, the necessary control signals and information are propagated along the memory bus 15. In addition to the CPU 10 and the memory subsystem 20 residing on the memory bus 15, other components of the computer must utilize the memory bus for various operations. Only one computer component is generally capable of utilizing the memory bus at a given time so it is important to minimize the memory bus utilization needs of the various components.

FIG. 1 also shows an optional serial cache memory 11 and an optional parallel cache memory 12. Cache memory is usually a smaller block of very fast memory in contrast with the relatively slow memory that is utilized as main memory in the memory subsystem. The external caches 11 and 12 shown in FIG. 1 are often referred to as Level II caches whereas a Level I cache is a cache memory incorporated directly within a CPU. It is essential that the data in a Level I and Level II cache be consistent with and correspond to the data maintained in the main memory. This is referred to as maintaining cache coherency.

When two or more cache memories are used they may have stored in them data from the same block of main memory. The coherency of the data being stored in these caches must be maintained. The coherency problem is to make sure a processor has a most recent copy of an object. Every cache that has a copy of the data from a block of physical memory also has a copy of information about the block of memory. The caches, being coupled either directly or indirectly to the shared memory bus must monitor or "snoop" on the bus to determine whether or not the cache has a copy of a requested memory block. On a read miss, all cache memories check to see if a copy of the requested block is in the cache and may take the appropriate action. The appropriate action will depend upon the type of system implemented. Some systems will implement cache-to-cache transfers in which the cache having the requested block will supply the data directly to the cache that missed. The preferred embodiment of the present invention will not utilize cache-to-cache transfers, but instead the detecting cache will signal the requesting cache to back off. Then, the cache having the requested block will write that block to main memory. The cache that backed off will then reissue its request. On a write, each cache determines if a copy is in the cache and then may act, either to invalidate its copy or to change the copy to the new value depending on implementation. In multiprocessing systems, it is not only necessary to maintain cache coherency between Level I and Level II caches, but also between the various Level I caches within respective processors. It is important to note here that the present invention to be described further herein is suitable for use in systems implementing cache-to-cache transfers though the preferred embodiment described does not implement such a feature.

Figure 2:
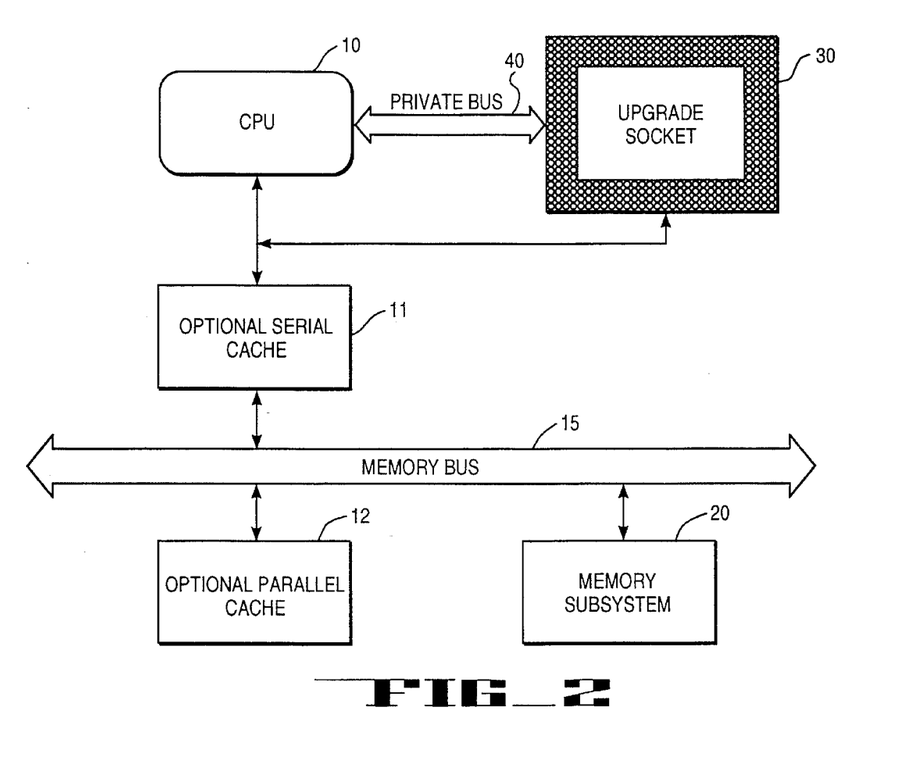
FIG. 2 shows a block layout of a computer system incorporating the present invention.

Referring now to FIG. 2, a block diagram of the microcomputer architecture in accordance with the present invention is illustrated. In addition to the traditional microcomputer components from FIG. 1, FIG. 2 illustrates an upgrade socket 30. The upgrade socket 30 is implemented such that it can host not only the various coprocessors described above, but an additional CPU, as well. In order for the present invention to provide for upgrading of a computer system from being a uniprocessor system to being a multiprocessing system it is necessary that a communications path be provided for signal propagation between the first CPU 10 and the processor inserted in upgrade socket 30. Thus, there is also provided a private communications bus 40 through which an arbitration protocol is implemented allowing the two CPUs to operate in tandem.

Figure 3:
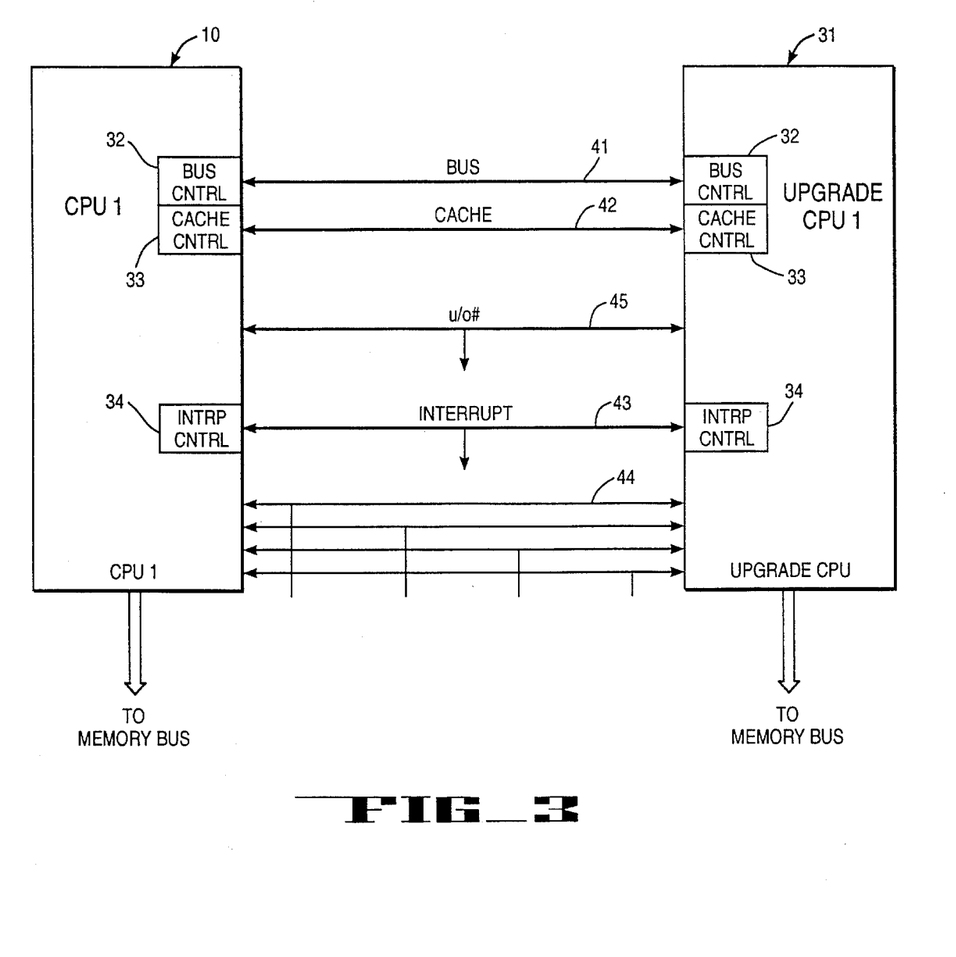
FIG. 3 shows an expanded view of two processors and the private bus lines between them in accordance with a preferred embodiment of the present invention.

FIG. 3 illustrates in more detail the signal line coupling of an original CPU 10 and an upgrade CPU 31 in accordance with the preferred embodiment of the present invention. In order for the present invention to be practiced, both the resident CPU 10 and upgrade CPU 31 need be equipped with hardware and/or firmware for utilizing the private bus 40 to operate as a dual-processor system. In FIG. 3 the private communications bus 40 is illustrated in its constituent portions, bus lines 41, cache lines 42, and interrupt processing lines 43. FIG. 3 also illustrates an optional communications line 45 designated u/o# which purpose will be described further herein. While some of the above communications lines have been referred to in the plural, that is only in accordance with the preferred embodiment and not a limitation. Alternative embodiments may be conceived for each of these sets of lines where each comprises a single signal line. For each of the lines that will be present each integrated circuit processor will have a corresponding pin for receiving and conveying signals. Thus, in the preferred embodiment of the present invention, 7 pins on each processor will be provided for dual-processing operation.

Both of the processing units 10 and 31 of FIG. 3 must also be equipped with circuitry for utilizing the private bus for operating in tandem on a common memory bus. Thus, the two processors are each equipped with bus controllers 32, cache controllers 33 and interrupt controllers 34. The various controllers will be described in terms of the functions which they are to perform. Once these functions are described, those skilled in the art will be able to implement the present invention without undue experimentation.

When the computer system of the present invention is operating as a dual-processor system only one of the two processors will have control access to the memory bus at a given time. This processor is considered the current master on the bus, the other is the previous master. When the previous master requires access to the bus it will signal through its bus controller 32 over private bus lines 41 to the bus controller 32 of the current master. After completing its current transaction the current master on the bus will relinquish the bus to the previous master via a bus grant signal over the private bus lines 41. The status of current master and previous master is then swapped between the two processors. The processors may swap bus access, when for example, the previous master requires reading data from the main memory into its internal Level I cache or when it must perform some I/O operations, etc.

The status of which processor is the current master on the bus may be exhibited externally by means of the optional u/o# signal to be described further herein. For implementation, it is only necessary that each processor be able to determine whether its bus status is that of previous master, and if so, it must request access to the bus from the current master before issuing a request on the memory bus. At initialization, it may be appropriate to designate the original processor, the one not in upgrade socket 30, as the current master on the bus.

At this point, it is worth noting that in operating a computer system in accordance with the present invention, the fact that the system is dual-processing instead of uni-processing may be hidden from the rest of the system. All incidents of bus ownership and Level I cache coherency are maintained "transparent" to the cache/memory subsystem by use of the private communications bus 40. It is true that the system operating in dual-processing mode will exhibit increased traffic on the memory bus, etc., however, the dual-processing nature is "transparent" in the sense that no other hardware in the system need be modified in order to accommodate the use of a second processor. Particularly, the memory subsystem 20 and its controllers are the same as those found in the traditional uni-processing system.

There are some instances when it may in fact be desirable for the system to be aware of the fact that more than one processor is running and to know which one has the status of current master. For example, advanced power saving features for various peripherals may need to know which processor is the current master. This is facilitated by the optional u/o# signal line 45. In the preferred embodiment implementing the signal line 45, when the original processor 10 is the current master, the u/o# signal line will be driven to a low value, a logical "0". When an upgrade processor in the upgrade socket 30 is the current master, the CPU 10 will stop driving the u/o# signal line 20 and it will be pulled to VCC, a logical "1". In this way where it is desirable for the system to determine if one processor or the other is the current master, the information is provided.

As described it is essential that cache coherency be maintained, therefore both processors will snoop the memory bus for read or write requests. One advantageous incident of the private communications bus 40 is that if the previous master detects a read request on the memory bus from the current master processor for a memory location that has already been stored in the Level I cache of the previous master, the previous master may act. In the preferred embodiment, the previous master will signal the current master over the private bus 40 that it has the data. The current master processor will switch ownership of the bus to the previous master which will write the current value of the data to the memory subsystem then relinquish control of the bus back to the processor which had been the current master which will then reissue its read request. In this way stale data in the memory system will not be read by one processor when the other processor has a more current version. Alternatively, as was indicated above, if the system is one which implements cache-to-cache transfers, then the previous master's Level I cache may directly supply the requested data to the current master.

One final necessity in operating a uniprocessing system as a dual-processing system is the proper handling of system interrupts. In the preferred embodiment each of the processors will incorporate interrupt controllers 34 coupled through the private communications bus 40 via interrupt lines 43. The private interrupt control line 43 is coupled externally to a compatible system interrupt controller. Interrupts may be directed to a specific processor or dispatched to a processor based on priority. Inter-processor interrupts may also be facilitated by the local interrupt controllers 34. In an alternative embodiment, the interrupt controllers may be provided externally rather than incorporated into the original processor and upgrade processor.

Figure 4:
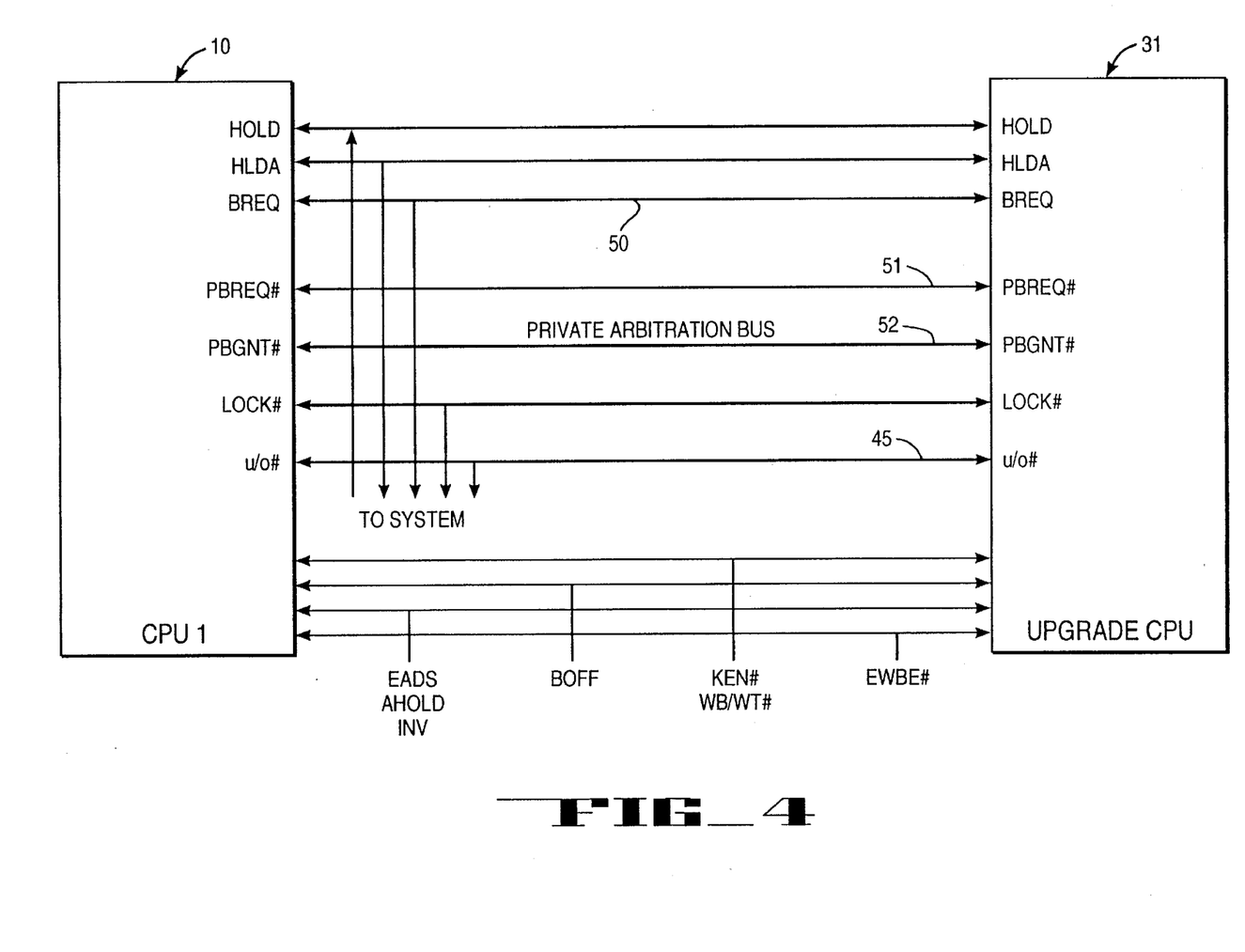
FIGS. 4 and 5 are more detailed views of two processors and signal lines utilized in accordance with the present invention.

FIG. 4 shows in more detail the signal lines utilized for the private bus arbitration scheme described above. First, when a processor is the current master, it will assert a bus request signal on BREQ line 50 which is coupled to both processors and to the system bus. The handling of bus requests for the dual-processing system is the same as for conventional single processor systems because the existence of the second processor is transparent to the rest of the system.

When the processor that is the previous master needs to become the current master processor on the bus, it sets an active signal on PBREQ# line 51 indicating the request on the private bus 40. When the current master is through transacting on the bus and is in a position to work from its Level I cache, it will send an active signal on PBGNT# line 52, granting the bus to the previous master with itself then becoming the previous master. This process is repeated each time the processor that is the previous master requires access to the memory bus. In some circumstances there may be some delay before the previous master is granted the bus. There are some operations, referred to as atomic transactions, that the current master may be executing which require it to retain access to the bus until the operation is completed. An example of such an operation is a read-modify-write transaction in which the current master will read a value and then change it. It must be allowed to complete these consecutive operations before the previous master can have access to the bus to prevent the previous master from reading intermediate data. During such operations, the current master may hold the LOCK# signal active indicating a lock cycle.

Figure 5:
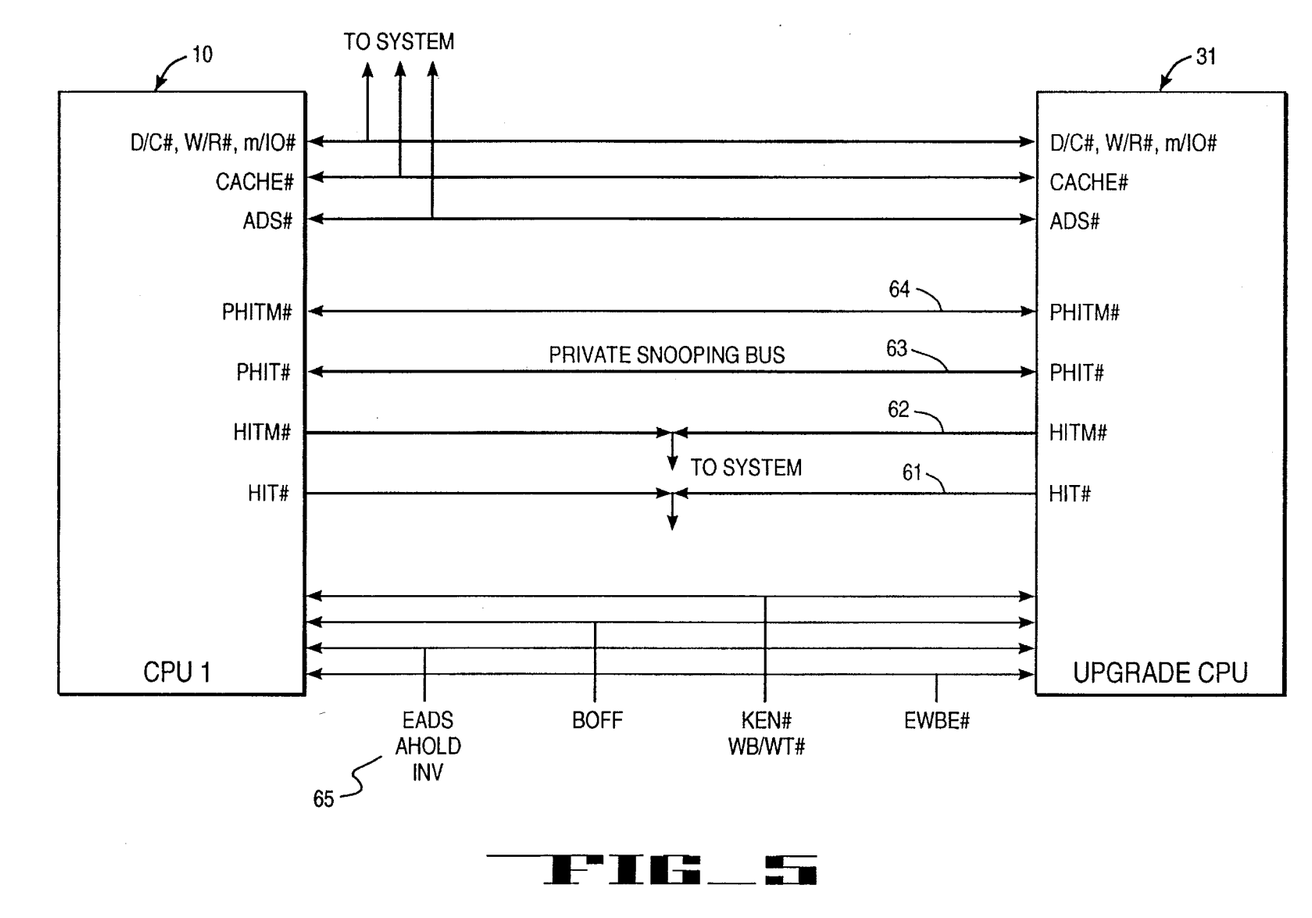

Referring now to FIG. 5, a more detailed description of the maintenance of private cache coherency is presented. First, a traditional uniprocessor system will snoop the memory bus when it has a Level I cache to make sure other components reading the memory subsystem receive current data. When snooping EADS line 65 is held active. In dual-processing operation both processors must snoop when an address is put on the bus. Each will compare the snooped address with the data resident in their respective Level I caches. If a processor has the data corresponding to the snooped address but the data is unmodified, the processor will send an active signal on HIT# line 61 indicating the integrity of the data in the memory subsystem. If a processor has modified the data in its Level I cache, then a hit modify signal will be activated on HITM# line 62. HIT# line 61 and HITM# 62 are coupled to both processors as well as to the system bus. When a hit to modified line occurs, the processor having the modified data in its Level I cache will supply the modified data, first requesting the bus if the processor is currently the previous master.

If a snoop address detected by the previous master was put on the bus by the current master, the previous master will check its Level I cache. A cache hit to unmodified data in this case will cause an active signal to be propagated on PHIT# line 63. If the data in the Level I cache of the previous master has been modified then PHITM# line 64 will go active.

PHIT# line 63 and PHITM# line 64 are the private bus cache coherency lines of the private communications bus 40. When the current master (first processor) detects that PHITM# line 64 has gone active, it will grant the bus to the previous master (second processor) which will provide the data to the memory subsystem. The first processor will then again become current master and will reissue the requested address on the bus. In this way, private cache coherency is maintained while the presence of a second processor is still transparent to the rest of the system.

One other feature incorporated in the present invention is the ability to detect the presence of a second CPU in upgrade socket 30 by the first CPU 10. The method in accordance with the present invention is that upon system boot-up, the CPU 10 is artificially privileged as the current master on the bus. The CPU 10 will determine the type of processor in upgrade socket 30 to determine if it is a second CPU, some other kind of processor, or if no processor present at all. If there is a second CPU in upgrade socket 30 then the bus sharing and cache coherency protocols described above may be initiated. Those skilled in the art may envision various signal exchanges for identifying processors.

Although the present invention has been described in terms of various embodiments, it will be appreciated by those skilled in the art that various modifications and alterations might be made without departing from the spirit and scope of the present invention. The invention should, therefore, be measured in terms of the claims which follow.

We claim:

1. In a computer system having a first central processing unit (CPU), a memory bus coupled to said first CPU, and an external memory coupled to said memory bus, an apparatus for upgrading said computer system to operate as a dual-processor computer system comprising:

an upgrade socket for receiving an integrated circuit package;

a private communications bus for coupling said first CPU to said upgrade socket; and a second CPU incorporated into said integrated circuit package for coupling to said computer system via said upgrade socket and for communicating with said first CPU through said private communications bus;

said first and second CPUs communicating over said private communications bus for exchanging ownership of said memory bus between said first and second CPUs.

2. The apparatus of claim 1 wherein said first and second CPUs have first and second internal cache memories, respectively, said apparatus further comprising means for maintaining cache coherency between said first and second internal cache memories.

3. The apparatus of claim 2 wherein said means for maintaining cache coherency between said first and second internal cache memories comprises:

snooping means incorporated in said first and second CPUs for snooping memory requests propagated over said memory bus;

means incorporated in each CPU for determining a cache hit in each respective CPU's internal cache memory;

first signaling means incorporated in each CPU for signaling the other CPU over said private communications bus when a cache hit occurs and a data item identified by the memory request and stored in the signaling CPU's internal cache memory has not been modified.

4. The apparatus of claim 3 wherein said means for maintaining cache coherency between said first and second internal cache memory further comprises:

second signaling means incorporated in each CPU for signaling the other CPU over said private communications bus when a cache hit occurs and a data item identified by the memory request and stored in the signaling CPU's internal cache memory has been modified;

means for granting the signaling CPU access to the memory bus over said private communications bus;

means for said signaling CPU to write the modified internal cache memory data to the external memory; and means for said signaling CPU to relinquish the memory bus back to the other CPU so that it can request the modified data from said external memory.

5. The apparatus of claim 3 wherein said means for maintaining cache coherency between said cache memories further comprises:

second signaling means incorporated in each CPU for signaling the other CPU when a cache hit occurs and a data item identified by the memory request and stored in the signaling CPU's internal cache memory has been modified; and means for said signaling CPU to transfer the requested data from its internal cache to the requesting CPU.

6. The apparatus of claim 2 wherein said external memory comprises an external cache and means for maintaining cache coherency between said first and second internal caches and said external cache.

7. The apparatus of claim 6 wherein upon a cache hit modified condition in one of said CPUs, said apparatus further comprises:

memory bus requesting means incorporated in said one of said CPUs for requesting access to the memory bus in the case when said one of said CPUs is not the current master on the bus; and data transfer means incorporated in said one of said CPUs for conveying modified cache data to said external memory.

8. The apparatus of claim 7 further comprising a signal line coupled between said first and second CPUs for indicating which of said first or second CPUs is the current master processor.

9. The apparatus of claim 2 further comprising means for processing system interrupts incorporated in said first and second CPUs, respectively, said system interrupts being conveyed to both said first and second CPUs when said system interrupts are initiated.

10. The apparatus of claim 2 further comprising interrupt processing means external to said first and second CPUs for processing system interrupts, said interrupt processing means being coupled to said first and second CPUs for conveying interrupt signals to said first and second CPUs, respectively.

11. The apparatus of claim 9 wherein said private communications bus comprises a plurality of signal lines between said first CPU and said upgrade socket, said signal lines for conveying signals for private bus arbitration, internal cache memory coherency, and system interrupts between said first and second CPUs.

12. The apparatus of claim 1 further comprising means for identifying said second CPU to said first CPU so that said computer system may operate as a dual-processor system when said second CPU is present in said upgrade socket.

13. In a computer system having a first central processing unit (CPU), a memory bus coupled to said first CPU, an external memory coupled to said memory bus, an upgrade socket for receiving an integrated circuit package and a private communications bus coupling said first CPU to said upgrade socket, an upgrade CPU for utilizing said computer system as a dual-processor computer system, said upgrade CPU comprising:

a private bus controller for communicating signals over said private communications bus, said signals including private bus request signals and private bus grant signals for exchanging ownership of said memory bus with said first CPU; and a cache controller for communicating cache hit and cache modified signals over said private communications bus.

14. The upgrade CPU of claim 13 further comprising an interrupt controller incorporated in said upgrade CPU for handling inter-processor interrupts.

15. The upgrade CPU of claim 13 further comprising:

two pins for coupling said private bus controller to said private communications bus; and two pins for coupling said cache controller to said private communications bus.

16. In a computer system having a first central processing unit (CPU), a memory bus coupled to said first CPU, and an external memory coupled to said memory bus, a method of utilizing said computer system as a multiprocessing computer system comprising the steps of:

providing an upgrade socket for receiving an integrated circuit package;

providing a private communications bus between said upgrade socket and said first CPU;

placing a second CPU in said upgrade socket for operating in tandem with said first CPU; and exchanging ownership of the memory bus between said first and second CPUs as each requires access thereto.

17. The method of claim 16 wherein when one of said first or second CPUs has access to the memory bus it is considered the current master processor while the other is considered the previous master processor, the step of exchanging ownership of the memory bus comprising the steps of:

said previous master processor requesting the memory bus over said private communications bus from said current master processor when said previous master requires memory bus access;

said current master processor completing any current transaction on the memory bus;

said current master processor signaling said previous master processor over said private communications bus a bus grant signal designating said previous master processor as the current master processor and itself then becoming the previous master processor.

18. The method of claim 17 wherein said requesting and granting steps comprise asserting active signals between bus control circuitry incorporated in said first and second CPUs over said private communications bus.

19. The method according to claim 16 wherein said first and second CPUs maintain first and second internal cache memories, respectively, said first and second CPUs alternatively considered current master and previous master CPUs, the current master CPU being the CPU which currently owns the memory bus, the previous master CPU being the CPU without current access to the memory bus, said current master and previous master status changing when access to said memory bus ownership is exchanged, the method further comprising the step of maintaining the coherency of the first and second internal cache memories.

20. The method according to claim 19 wherein said step of maintaining cache coherency comprises the steps of:

said previous master CPU snooping memory requests over said memory bus;

said previous master CPU signaling said current master CPU over said private communications bus upon a cache hit of unmodified data; and said previous master CPU signaling said current master CPU over said private communications bus upon a cache hit of modified data.

21. The method of claim 20 wherein upon a cache hit of modified data said method further comprises the following steps:

said previous master processor accessing the memory bus;

said previous master processor writing modified cache data to said memory subsystem;

relinquishing access to said memory bus; and said current master CPU continuing its requested transaction.

22. The method of claim 20 wherein upon a cache hit of modified data the method further comprises the step of said previous master CPU supplying said requested data to said current master processor.

23. The method according to claim 19 wherein said memory subsystem further comprises an external cache memory, the method further comprising the step of maintaining cache coherency between said first and second internal cache memories and said external cache memory.

24. The method according to claim 16 further comprising sharing interrupt signals between said first and second CPUs over said private communications bus.

25. The method according to claim 16 further comprising upon system power-up, said second CPU identifying its presence in said upgrade socket to said first CPU over said private communications bus.

26. A computer system suitable for receiving an upgrade microprocessor and operating as a multiprocessing computer system with said upgrade microprocessor, said computer system having a first central processing unit (CPU), a memory bus communicating with said first CPU, and an external memory communicating with said memory bus, said computer system comprising:

an upgrade microprocessor socket for receiving said upgrade microprocessor;

a private communications bus for coupling said first CPU to said upgrade microprocessor socket; and an interprocessor communications bus controller incorporated in said first CPU for communicating over private communications bus with said upgrade microprocessor when it is present in said upgrade microprocessor socket.

27. The computer system of claim 26 wherein said first CPU and said upgrade microprocessor have first and second internal cache memories, respectively, said computer system further comprising a cache controller for maintaining cache coherency between said first and second internal cache memories.

28. The computer system of claim 27 further comprising an interrupt controller incorporated in said first CPU for processing interprocessor interrupts.

29. The computer system of claim 27 wherein said external memory comprises an external cache, said computer system further comprising means for maintaining cache coherency between said first and second internal cache memories and said external cache.

30. The computer system of claim 27 wherein said interprocessor communications bus controller comprises means for exchanging ownership of said memory bus between said first CPU and said upgrade microprocessor CPU by exchanging signals over said private communication bus.

31. The computer system of claim 30 further comprising a signal line coupled between said first CPU and said upgrade microprocessor socket for indicating a "current master" relationship between said first CPU and an upgrade microprocessor if one is present in said upgrade microprocessor socket.

32. The computer system of claim 28 wherein said interprocessor communications bus comprises a plurality of signal lines coupled between said first CPU and said upgrade microprocessor socket, said signal lines for conveying signals for bus arbitration, internal cache memory coherency and system interrupts.

33. The computer system of claim 26 further comprising means for identifying the presence of an upgrade microprocessor in said upgrade microprocessor socket.

\* \* \* \* \*

UNITED STATES PATENT AND TRADEMARK OFFICE
CERTIFICATE OF CORRECTION

PATENT NO.    : 5,490,279
DATED         : February 6, 1996
INVENTOR(S)   : Golbert et al.

It is certified that error appears in the above-identified patent and that said Letters Patent is hereby corrected as shown below:

On the title page, in Section [75], change the second inventor's last name from "Carean" to --Carmean--.

Signed and Sealed this

Fifteenth Day of October, 1996

Attest:

BRUCE LEHMAN

*Attesting Officer*        *Commissioner of Patents and Trademarks*